United States Patent
Chai et al.

(10) Patent No.: US 10,044,305 B2
(45) Date of Patent: Aug. 7, 2018

(54) CONTROLLING AIRCRAFT VFG OVER VOLTAGE UNDER FAULT OR LOAD-SHED

(71) Applicant: HAMILTON SUNDSTRAND CORPORATION, Charlotte, NC (US)

(72) Inventors: Huazhen Chai, Caledonia, IL (US); Andreas C. Koenig, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/387,923

(22) Filed: Dec. 22, 2016

(65) Prior Publication Data
US 2018/0183371 A1   Jun. 28, 2018

(51) Int. Cl.
*H02P 9/10* (2006.01)

(52) U.S. Cl.
CPC ................. *H02P 9/10* (2013.01)

(58) Field of Classification Search
CPC ........................................... H02P 9/10
See application file for complete search history.

(56) References Cited

U.S. PATENT DOCUMENTS

| | | | | |
|---|---|---|---|---|
| 4,812,729 A * | 3/1989 | Ito | ............. | H02H 7/1216 318/732 |
| 4,894,602 A * | 1/1990 | Davis | ............. | F02P 3/0552 123/335 |
| 5,083,077 A * | 1/1992 | Wallace | ............. | H02P 9/007 318/729 |
| 5,325,043 A | 6/1994 | Parro | | |
| 5,801,460 A | 9/1998 | Diemer et al. | | |
| 5,850,138 A | 12/1998 | Adams et al. | | |
| 5,900,722 A * | 5/1999 | Scott | ............. | B23K 9/1062 290/49 |
| 6,181,112 B1 | 1/2001 | Latos et al. | | |
| 7,952,316 B2 * | 5/2011 | Ganev | ............. | H02P 25/22 318/524 |
| 9,257,889 B2 | 2/2016 | Rozman et al. | | |
| 2002/0163262 A1 * | 11/2002 | Hsu | ............. | H02K 3/28 310/68 R |

(Continued)

FOREIGN PATENT DOCUMENTS

DE   102015208302 A1   1/2016

OTHER PUBLICATIONS

European Search Report, International Application No. 17210066.1-1202, dated May 25, 2018, 11 pages.

*Primary Examiner* — Viet Nguyen
(74) *Attorney, Agent, or Firm* — Cantor Colburn LLP (57) ABSTRACT

Embodiments include a technique for controlling aircraft VFG over voltage under fault or load-shed, the techniques includes using a control unit for generating signals to maintain a terminal output voltage and frequency, and a variable frequency generator, coupled to the control unit, for generating the terminal output voltage. The variable frequency generator includes a stator having a set of primary stator windings and a set of secondary stator windings for generating the terminal output voltage, and a switch coupled to the set of secondary stator windings, the switch is configured to operate at a threshold frequency of the VFG to regulate the terminal output voltage by supplementing the terminal output voltage produced by the set of primary stator windings reducing the VFG fault over-voltage.

16 Claims, 7 Drawing Sheets

(56) References Cited

U.S. PATENT DOCUMENTS

| | | | |
|---|---|---|---|
| 2002/0171246 A1* | 11/2002 | Dietz | B60K 6/26 |
| | | | 290/40 C |
| 2003/0173938 A1 | 9/2003 | Trainer et al. | |
| 2005/0116689 A1* | 6/2005 | Fogarty | H02P 9/04 |
| | | | 322/29 |
| 2012/0147634 A1* | 6/2012 | Jones | H02M 1/32 |
| | | | 363/37 |
| 2012/0286523 A1* | 11/2012 | Hull | H02P 9/48 |
| | | | 290/40 A |
| 2014/0375238 A1* | 12/2014 | Kurfiss | H02J 7/14 |
| | | | 318/400.22 |
| 2015/0288271 A1* | 10/2015 | Kuznetsov | H01F 27/18 |
| | | | 322/63 |
| 2016/0043601 A1 | 2/2016 | Kawamura | |
| 2016/0204728 A1 | 7/2016 | Notohara et al. | |
| 2017/0133971 A1* | 5/2017 | Huang | H02P 29/0241 |
| 2017/0207738 A1* | 7/2017 | Meyer | H02P 9/48 |

\* cited by examiner

CONTROLLING AIRCRAFT VFG OVER VOLTAGE UNDER FAULT OR LOAD-SHED

BACKGROUND

The present invention relates generally to electrical generators, and more particularly, the present invention relates to an apparatus and method for controlling aircraft VFG over-voltage under fault or load-shed.

Power electronics play a significant role in the modern aircraft and spacecraft industry. Generators can be used to convert mechanical energy into electrical energy to provide electrical power to various systems. Fixed frequency generators and variable frequency generators (VFG) can be used to provide power to the aircraft. The output power of the VFG is a function of the rotational speed of the generator and the connected load. A constant output voltage must be supplied by the generator in order to be usable by the aircraft's electronics. The size of the components of electronics determines the high voltage capacity and maximum level capability of the power system. Systems can be designed to withstand faults and over-voltages that can occur.

BRIEF DESCRIPTION

An embodiment includes a system for controlling aircraft VFG over-voltage under fault or load-shed. The system includes a control unit for generating signals to maintain a terminal output voltage and frequency, and a variable frequency generator, coupled to the control unit, for generating the terminal output voltage. The variable frequency generator includes a stator having a set of primary stator windings and a set of secondary stator windings for generating the terminal output voltage, and a switch coupled to the set of secondary stator windings, the switch is configured to operate at a threshold frequency of the VFG to regulate the terminal output voltage by supplementing the terminal output voltage produced by the set of primary stator windings reducing the VFG fault over-voltage.

Another embodiment includes a method for controlling aircraft VFG over-voltage under fault or load-shed. The method includes generating signals, by a control unit, to maintain a terminal output voltage and frequency of the VFG, and generating, by the VFG, the terminal output voltage. The VFG includes a stator having a set of primary stator windings and a set of secondary stator windings for generating the terminal output voltage. The method includes operating a switch coupled to the set of secondary stator windings, the switch being configured to operate at a threshold frequency of the VFG, to regulate the terminal output voltage by supplementing the terminal output voltage produced by the set of primary stator windings reducing the VFG fault over-voltage.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

A prior art generating system including a variable Frequency generator (VFG) controlled by a generator control unit (GCU) for generating variable frequency constant voltage power for driving aircraft loads. Large portion of the VFG loads are electronic type of loads.

In the cases of fixed frequency generators, the generator generates relatively moderate over-voltages under fault. However, in cases using VFGs, the varying speed affects the frequency of the terminal output voltage, which in turn affects the output voltage level.

A generator produces internal electromotive force (emf) E that is continuously regulated by a GCU to maintain a constant terminal voltage V. Under a no-load condition, E=V because voltage drop over synchronous reactance (that is, the total effects of the stator winding reactance and armature reactance) is zero. Under load conditions, when load current is not zero, and hence the reactance drop is not zero, the emf E is increased automatically by the GCU to compensate for the voltage drop so that the terminal voltage can be maintained. For a generator designed for a fixed 400 Hz frequency, the stator core size and windings can be selected to limit the ability of the generator to produce an emf E higher than the permissible maximum voltage limit of the electrical system it powers.

Figure 5:
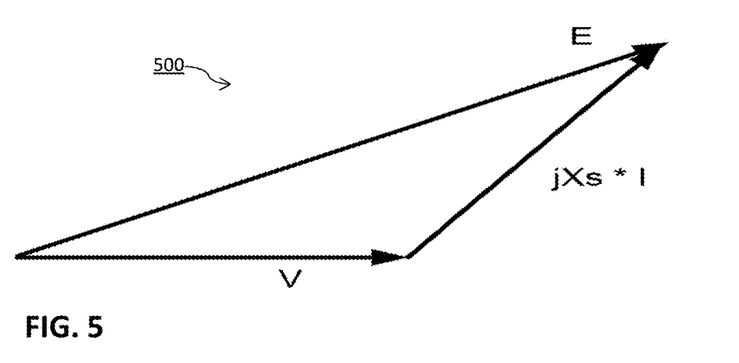
Figure 6:
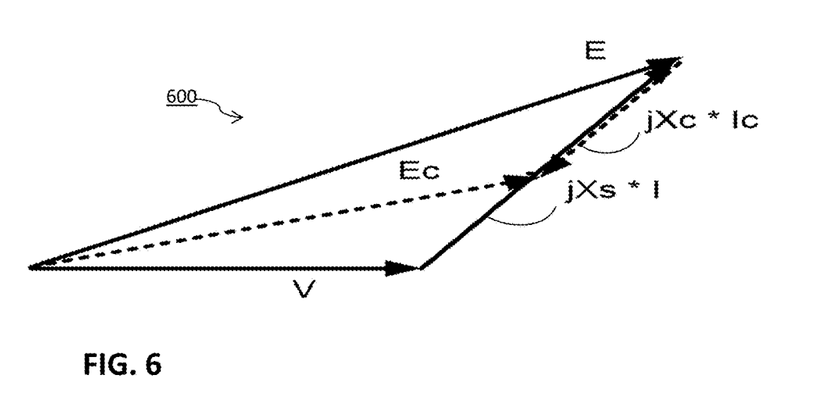

For generators designed to operate over a frequency range different challenges are presented. Due to higher synchronous reactance voltage drops, a higher internal emf is needed (as illustrated in FIG. 5 and FIG. 6) to maintain fixed terminal output voltage at higher frequencies. The risk of higher over-voltage faults can realized at higher frequencies when compared to operating at low or minimum frequency of the system.

Issues can arise when a load on the generator is suddenly reduced or removed. This issue can be compounded when used in conjunction with a variable speed generator. Such generators produce an output from the main stator windings over a wide frequency range (for example, 400 Hertz (Hz) to 800 Hz). The generator is designed to provide the desired regulated voltage for a full load at the lower end of the frequency range and therefore has a much higher output voltage capability at the higher end of the frequency range.

When the load is suddenly reduced or removed, the generator terminal output voltage rises to a level close to the internal emf or E if the generator core is not saturated. At higher frequency (FIG. 5) the internal emf E can be significantly higher than that at low frequency (FIG. 4) therefore the terminal voltage at fault can be much higher. This can lead to transient over-voltages which are beyond permissible levels and can cause damage to equipment supplied by the generator.

In an embodiment, if the internal emf Ec is maintained closer to a lower magnitude under all operating frequencies, the fault voltage and fault current would be reduced to a similar corresponding level of those under fixed frequency generator cases (for example, as illustrated by the dashed lines in FIG. 6). The peak fault current seen by power electronic devices would be lower (the same as that in fixed frequency generator) therefore component size and costs for all line-replacement units in the power system can be reduced.

The terminal output voltage of the generator can be configured for various applications. In one or more embodiments, aircraft applications can use 115 volts (V). As a load is placed on the terminals of the generator, the output voltage will begin to drop. In an effort to maintain the output voltage, the current of the rotor can be increased to compensate for the reduced output voltage. This current can boost the output voltage of the generator to 115 V.

In VFGs, at higher frequencies, the danger is realized at the highest speed when the load is suddenly removed. The spike in voltage becomes even higher when compared to operating at the lowest speed. The connected equipment will no longer be able to withstand the spike at the highest speed. If the connected equipment is designed to saturate at a low speed, the issue becomes critical. This occurs because there is an excessive amount of current remaining in the field and stator windings and cannot be removed fast enough to bring the voltage down to avoid damage to the connected equipment.

Figure 2A:
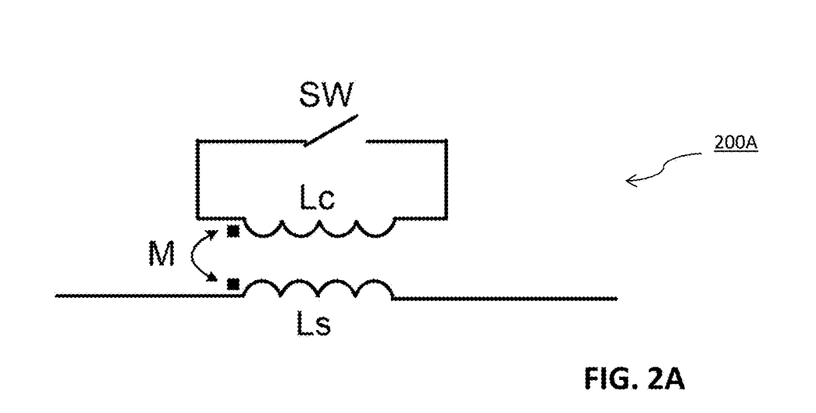
FIGS. 2A and 2B illustrate a model for controlling aircraft VFG over-voltage under fault or load-shed.
Figure 2B:
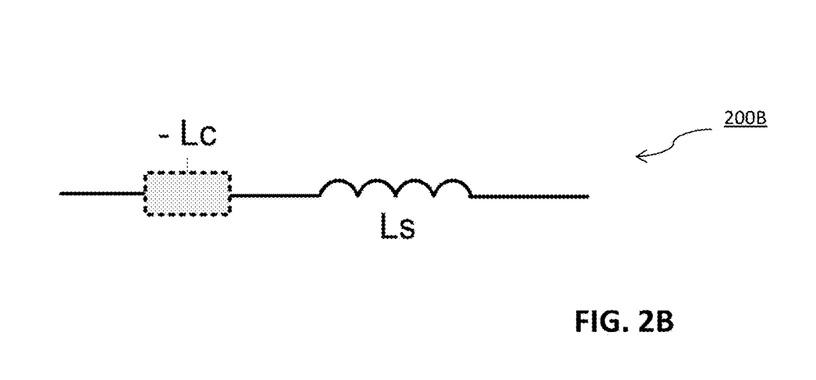

Using the technique described herein, the current supplied to the main field and the operation of GCU is unaffected and untapped with. Instead, a set of secondary stator windings of smaller size with different equivalent wire gauge or number of turns is used and these windings are switched by a set of switches to offset the "armature reaction" effects or the effective synchronous reactance of the stator windings. This is illustrated in FIG. 2A, FIG. 2B and dashed line in FIG. 6. This allows for the output voltage of the generator to be controlled, while reducing the risk of over-voltage.

In one or more embodiments, power electronic switches connected to the VFG would have to be sized for peak transient fault current (Epk/Ls). At 800 Hz this value can be very high as explained.

Figure 1:
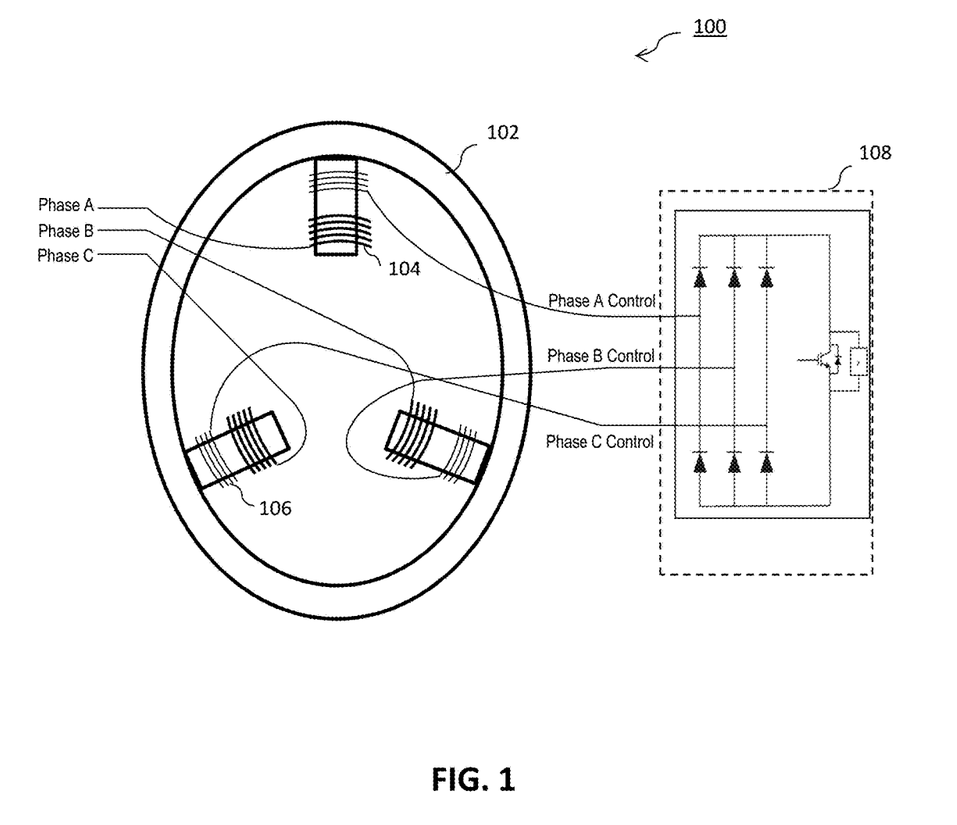
FIG. 1 illustrates a system for controlling aircraft variable frequency generator VFG over-voltage under fault or load-shed.

Now referring to FIG. 1 a stator 102 of a system 100 for controlling aircraft VFG over-voltage under fault or loadshed. The stator 102 of a VFG includes a set of primary stator windings 104 and a set of secondary stator windings 106. The secondary stator windings are coupled to a switch 108 that is used to regulate the synchronous reactance voltage drop (jXs*I) and the emf (E) of the generator. In one or more embodiments, the switch can be a PWM controlled insulated-gate bipolar transistor IGBT switch. In a different embodiment, the switch can be other type of semiconductor switches. The secondary stator windings 106 can be controlled by a control unit.

In one or more embodiments, the VFG can operate between 400 Hz and 800 Hz. Under normal operation, the primary stator windings 104 will provide the emf needed for operation. As the frequency of the VFG increases, the secondary stator windings 106 will be switched to supplement the emf generated by the primary stator windings 104. In one or more embodiments, when the frequency exceeds a configurable threshold, the secondary stator windings 106 will be switched to supplement the emf generated by the primary stator windings 104. As the secondary stator windings 106 supplement the primary stator winding 104, the primary stator windings 104 are no longer required to produce as much emf at the higher frequency, thus reducing the risk of over-voltage. The secondary stator windings 106 are controlled by the switch 108. Current is injected into the secondary stator windings 106, under the control of the switch 108, to generate the voltage needed. If a fault is detected, the switch 108 is operated to prevent the flow of current to the set of secondary windings 106 and the terminal output voltage is maintained using the set of primary stator windings.

In the event a fault or sudden removal of a load is detected by the VFG, the switch 108 can control the secondary stator windings 106 to stop generating the emf to supplement the emf generated by the primary windings 104 by controlling the amount of current supplied to the secondary stator windings 106. This allows the VFG to quickly and efficiently control the terminal output voltage using the secondary stator windings 106 and switch 108.

In one or more embodiments, the switch 108 can be controlled to increase emf generated by the secondary stator windings 106 as the frequency increases to maintain the output terminal voltage by injecting current into the secondary stator windings.

In one or more embodiments, a PWM switch is used and the PWM duty cycle can be increased/decreased as the frequency changes to regulate the reactance at the same value at different frequencies. This configuration allows for the internal emf to be maintained closer to a lower magnitude under all operating frequencies to effectively reduce the fault voltage and fault current. In one or more embodiments, the separate set of secondary stator windings can be used to regulate the synchronous reactance drop so that the total E is maintained at the substantially the same magnitude as that under 400 Hz case.

In this case, there is another 3-phase winding that is used to generate power. Inverters can be used to inject current into the secondary 3-phase winding to control the supplemental emf. An inverter can be used to control the current injected into the secondary winding.

In one or more embodiments, the stator windings can include various wire gauge sizes and the stator windings can have a different number of turns. In one or more embodiments, the primary stator windings of the stator uses a larger wire gauge size than the secondary stator windings and the secondary windings have a higher number of turns.

In a different embodiment, the system can be coupled with a permanent magnet generator (PMG) to stop the PMG from generating fault voltage and current, or regulate transient faults.

In one or more embodiments, the generator can be designed for a fixed frequency. That is the stator core size and windings can be selected to achieve a desired performance. In an embodiment, the generator can be designed for a fixed 400 Hz frequency.

In one or more embodiments, power electronic switches connected to the VFG can be sized for peak transient fault current (Epk/Ls). At increased frequencies, e.g. 800 Hz, this value can be very high as explained.

Referring to FIG. 2A, a model 200A for controlling aircraft VFG overload under over-voltage or load-shed is provided. The model 200A provides a configuration for a set of magnetically coupled stator windings (Lc and Ls) that can be switched by the semiconductor switch SW. M represents the magnetically coupled stator windings. In an embodiment, the switch SW is a PWM controlled switch. The synchronous reactance (jXs*I) and emf (E) can be regulated by using the set of windings that is PWM switched. FIG. 2B provides an equivalent model 200B for FIG. 2A when the coupled inductor is partially shorted by a PWM controlled switch.

Figure 3:
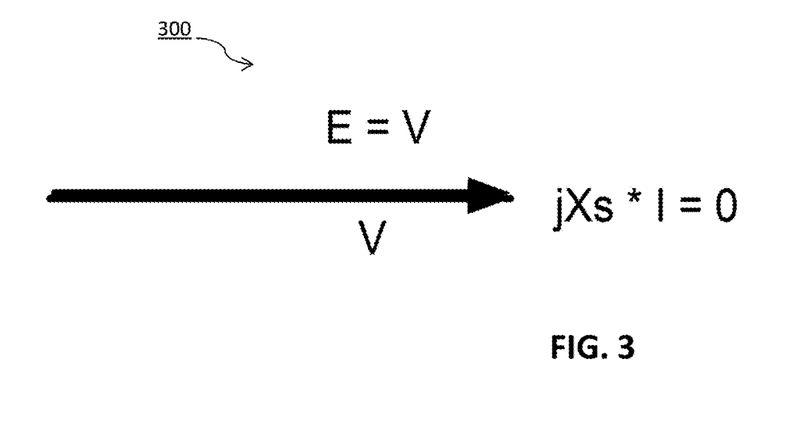
FIGS. 3, 4, 5, and 6 illustrate phasor diagrams for controlling aircraft VFG over-voltage under fault or load-shed.

Referring to FIG. 3, a phasor diagram 300 for controlling aircraft over-voltage is shown. Under a no-load condition, the internal emf E is equal to the terminal output voltage V (E=V) because the voltage drop over synchronous reactance is zero. FIG. 3 depicts the no-load condition as shown the E vector and V vector (overlaid upon one another) are the same magnitude and are in the same direction resulting in the synchronous reactance (jXs*I) is zero. However, as the frequency of the VFG increases, the synchronous reactance also increases. In turn, the emf E must be increased to overcome the increase in the synchronous reactance drop to maintain the terminal output voltage.

Figure 4:
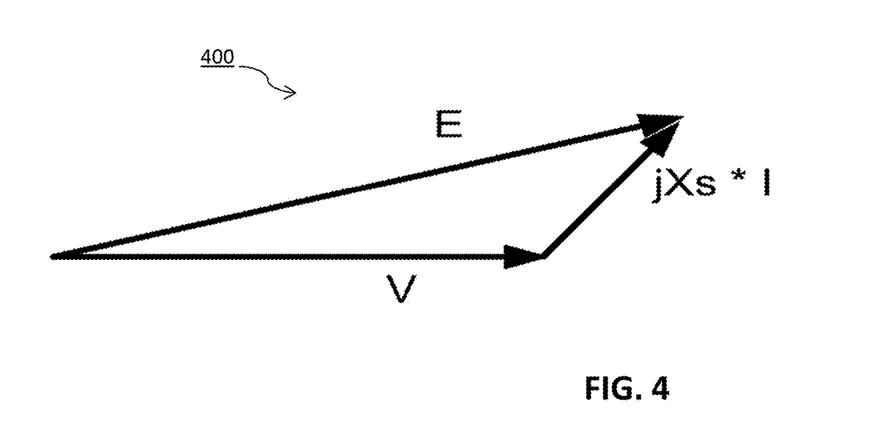

Now referring to FIG. 4, a phasor diagram 400 for 400 Hz operation for a given VFG is shown. The example phasor diagram 400 illustrates the terminal output voltage V, a synchronous drop (jXs*I), and an internal emf E generated by the primary stator windings. Due to the load placed on the output terminals of the VFG, a synchronous reactance is realized.

Now referring to FIG. 5, a phasor diagram 500 for 800 Hz operation for a given VFG is shown. The example phasor diagram 500 illustrates the terminal output voltage V, a synchronous voltage drop (jXs*I), and an internal emf E generated by the VFG. In this example, as the frequency increased from 400 Hz to 800 Hz the synchronous reactance has also increases. The magnitude of (jXs*I) has doubled and the magnitude of the internal emf E produced by the primary stator windings is significantly larger to compensate for the synchronous reactance voltage drop. As shown by comparing the phasor diagrams of FIG. 4 and FIG. 5, if the load is suddenly removed from the system the overload voltage at the higher frequency is likely to cause more damage given the larger emf E.

In this particular instance, there is a substantial amount of current remaining in the rotor winding and is not removed or discharged fast enough to avoid damaging the connected equipment. Therefore, the disclosure provides a technique for reducing the amount of current in the main field and augmenting with a secondary stator winding that is controlled by a switch to boost the voltage produced by the primary stator windings. Efficient control over the secondary winding can be performed and can be switched quickly in response to a fault detection or sudden load removal. In the event a load is reduced or removed, the secondary stator windings can stop supplementing the emf produced by the primary stator windings and the output voltage can still be maintained. In addition, the secondary stator windings can be controlled to provide magnetic flux in whichever direction that it is needed by controlling the amount of current injected into the secondary stator windings.

Referring now to FIG. 6, a phasor diagram 600 for controlling aircraft VFG over voltage is shown. The VFG includes primary stator windings in combination with the secondary stator windings.

As the secondary stator windings are operating, less exciter current is needed in the primary stators windings to maintain the terminal output voltage, therefore reducing the risk of over voltage and over current damage. In one or more embodiments, the current is injected into the secondary stator windings to create a phasor (jXc*Ic) that is 180 degrees out of phase to jXs*I. The resultant Ec would be closer to E at 400 Hz, the minimum frequency range. The control of the magnitude for (Xc*Ic) can be open-loop in nature. It can have a feed-forward style such as k*(f−400), where k is a constant, f is the VFG frequency, and 400 Hz is the reference frequency. The operation of the secondary stator windings reduces the electromotive force required from the primary stator windings to maintain the needed output terminal voltage.

Figure 7A:
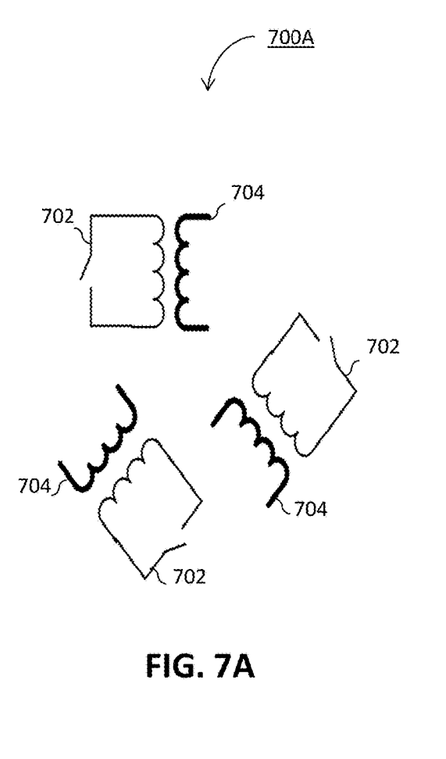
FIGS. 7A and 7B illustrate a configuration for controlling aircraft VFG over-voltage under fault or load-shed.

FIG. 7A provides a configuration 700A for controlling aircraft VFG over voltage. In this configuration, each secondary stator winding 106 can be coupled to an individual switch for controlling each winding. In configuration 700A the secondary stator windings are represented by inductors 704, where each inductor is coupled to a separate switch 702. In an embodiment, the switches are controlled by a GCU which operates the switch 702 based on a PWM signal. The synchronous reactance and emf of the VFG can be regulated by a set of magnetically coupled stator windings that are PWM switched with a semiconductor switch.

Figure 7B:
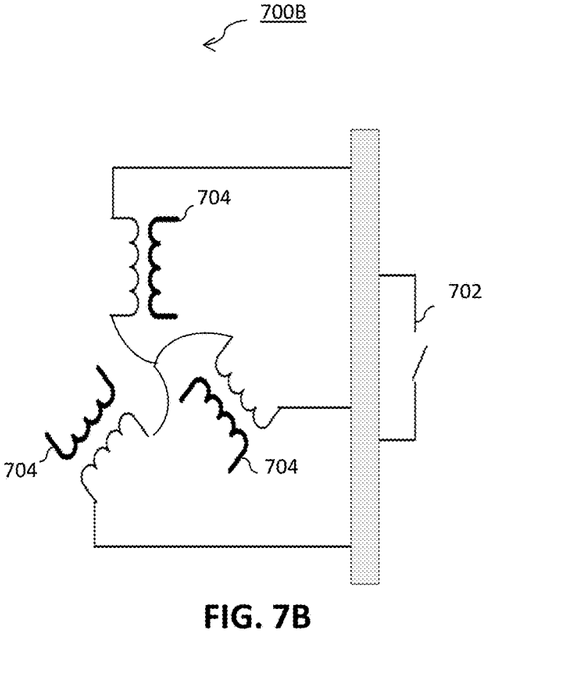

Now referring to FIG. 7B, a different configuration 700B for controlling aircraft VFG over-voltage is shown. In this particular configuration, each of the secondary stator windings 106 is coupled to a common or a single switch. The configuration of 700B represents each winding of the secondary stator winding as an inductor 704, where each inductor 704 is coupled to a common switch 702. In an embodiment, the switch is a PWM controlled switch being controlled by a GCU to vary the PWM signal supplied to the secondary stator windings.

Figure 8A:
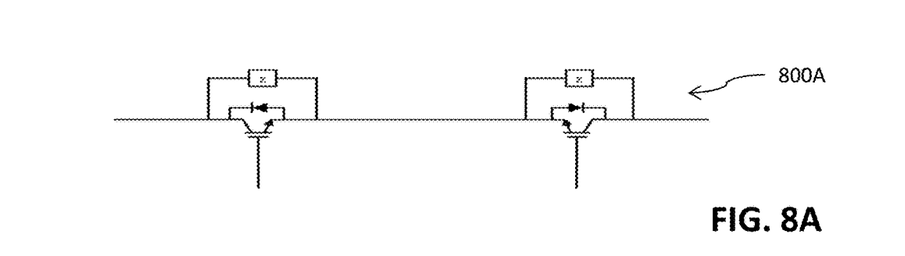
FIGS. 8A, 8B, 8C, and 8D illustrate various switch types for controlling aircraft VFG over-voltage under fault or load-shed.
Figure 8B:
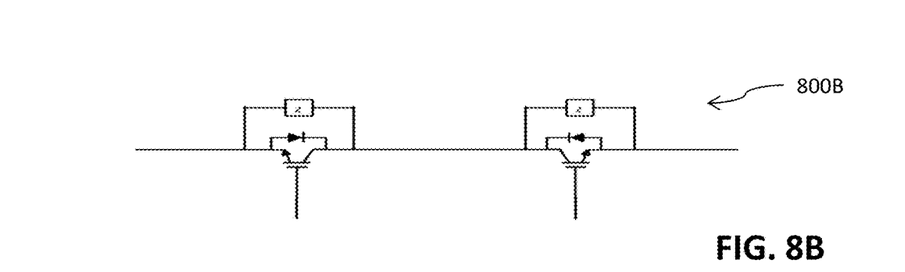
Figure 8C:
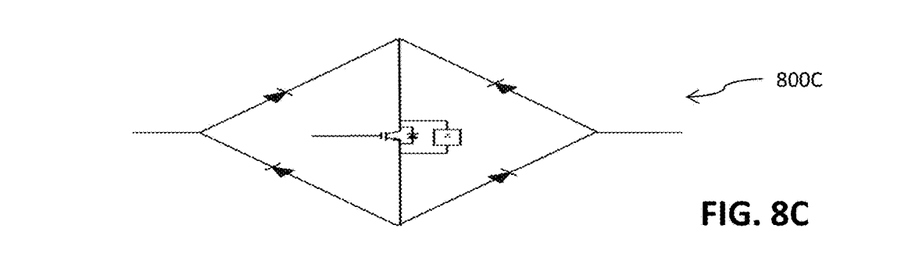

Referring now to FIG. 8A, a first switch configuration 800A for controlling aircraft VFG over-voltage is shown. The first configuration 800A includes two transistors that are coupled together in series that can be connected to each individual winding of the secondary winding. FIG. 8B provides a second configuration 800B for controlling aircraft VFG over-voltage. The configuration 800B is similar to 800A however the position of the two transistors is reversed. FIG. 8C provides a different configuration for controlling aircraft VFG over-voltage.

Figure 8D:
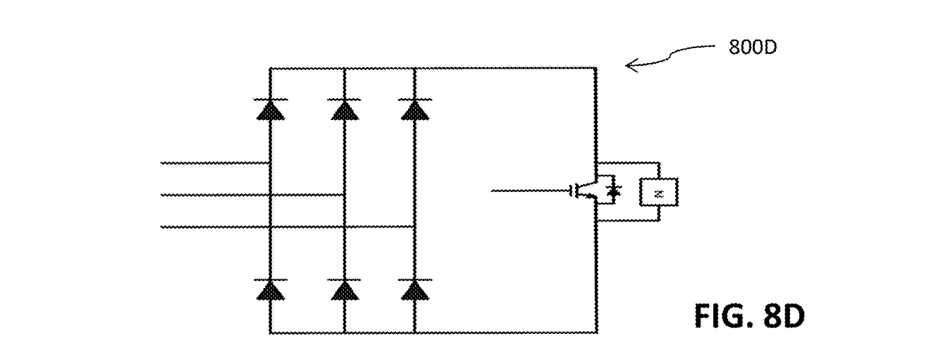

Referring now to FIG. 8D, a configuration 800D for a single common switch for controlling aircraft over-voltage is shown. The switch configuration 800D can be couple to the secondary stator windings 106 as shown in FIG. 1.

Figure 9A:
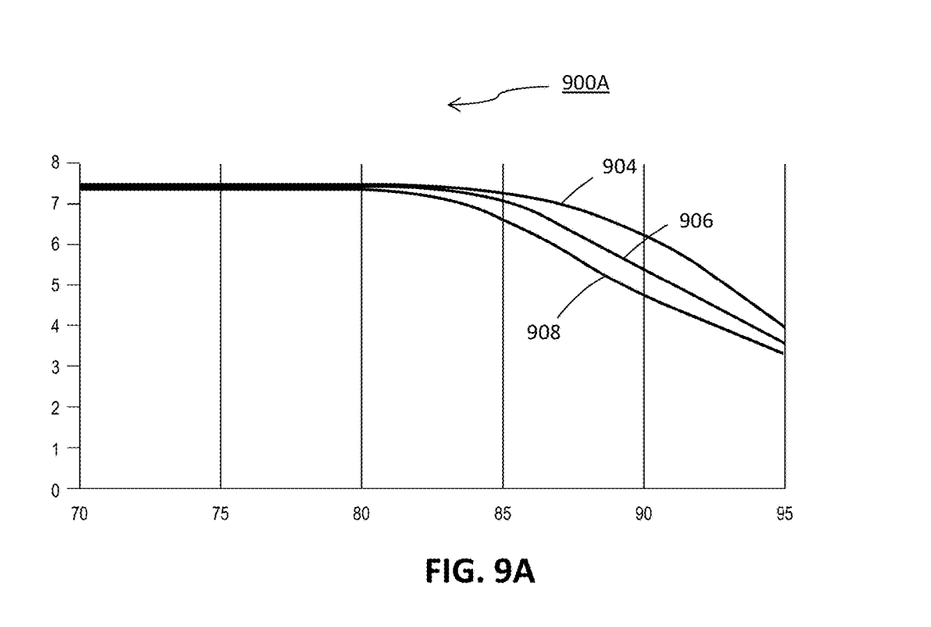
FIGS. 9A and 9B illustrate a graph for controlling aircraft VFG over-voltage under fault or load-shed.

Now referring to FIG. 9A, a graph 900A for controlling VFG over-voltage is shown. Graph 900A provides the equivalent stator synchronous inductance against the PWM duty cycle. Three graphs are shown. The first graph 904 provides the result of the VFG operating at 400 Hz. A second graph 906 provides the result of the VFG operating at 600 Hz. A third chart 908 provides the result of the VFG operating at 800 Hz. As shown in the three graphs, as the PWM duty increases the synchronous inductance of the stator is reduced.

Figure 9B:
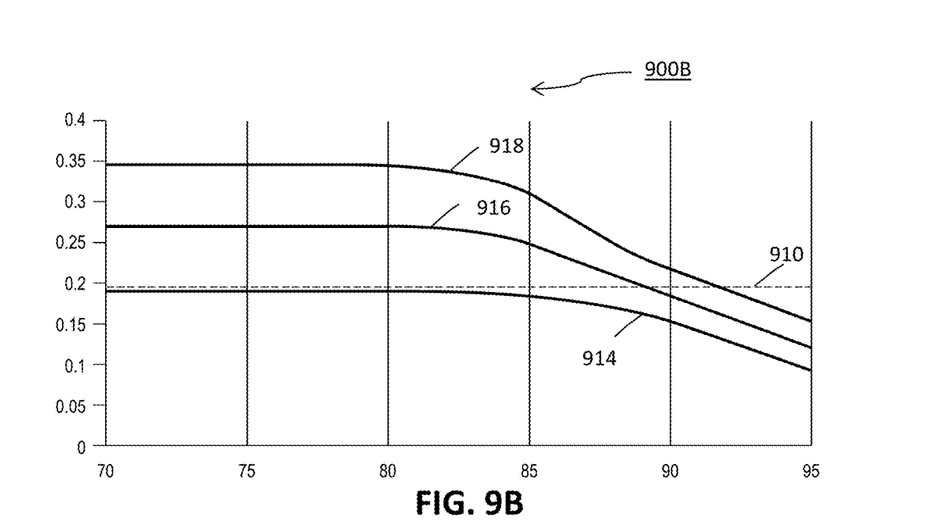

FIG. 9B illustrates a different graph 900B for controlling VFG over-voltage. Graph 900B provides three different graphs of the equivalent stator reactance against the PWM duty for operating the VFG at different frequencies. A first graph 914 provides the operation of the VFG at 400 Hz. A second graph 916 provides the result of the operation at 600 Hz. A third graph 918 provides the result of operation at 800 Hz. Graph 900B illustrates that as the frequency increases the synchronous reactance increases for a given PWM duty cycle where the 400 Hz reference line 910 is used. Also, as the PWM cycle increases used to control the secondary stator windings, the synchronous reactance for each graph begins to decrease.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A system for controlling aircraft variable frequency generator VFG over voltage under fault or load-shed, the system comprising:
a control unit for generating signals to maintain a terminal output voltage and frequency; and
a variable frequency generator, coupled the control unit, for generating the terminal output voltage, the variable frequency generator comprising:
a stator comprising a set of primary stator windings and a set of secondary stator windings for generating the terminal output voltage; and
a switch coupled to the set of secondary stator windings, the switch is configured to operate at a threshold frequency of the VFG to regulate the terminal output voltage by supplementing the terminal output voltage produced by the set of primary stator windings reducing the VFG fault over-voltage, wherein, responsive to detecting a fault, operating the switch to prevent a supply of current to the set of secondary windings and maintaining the terminal output voltage using the set of primary windings.

2. The system of claim 1, wherein each secondary stator winding is coupled to and controlled by individual switches.

3. The system of claim 1, wherein each secondary stator winding is coupled to and controlled by a single common switch.

4. The system of claim 1, wherein the switch is a pulse-width modulated PWM controlled switch.

5. The system of claim 1, wherein the control unit is a generator control unit for controlling the set of primary stator windings and the switch coupled to the set of secondary stator windings.

6. The system of claim 1, wherein the set of secondary stator windings comprises a wire gauge or number of strands in hand different than that used in the primary stator windings, and the secondary stator windings comprises a different number of turns than the primary stator windings.

7. The system of claim 1, further comprising operating the VFG above a configurable threshold frequency, the set of secondary stator windings supplement the set of primary stator windings by reducing an amount of exciter current supplied to the set of primary stator windings and increasing the amount of exciter current supplied to the set of secondary stator windings while maintaining the terminal output voltage.

8. The system of claim 1, wherein the terminal output voltage is regulated by adjusting the PWM duty cycle of the switch controlling the set of secondary stator windings, wherein the adjustment of the PWM duty cycle is based on the frequency of the VFG.

9. A method for controlling aircraft variable frequency generator VFG over voltage under fault or load-shed, the method comprising:
generating signals, by a control unit, to maintain a terminal output voltage and frequency of the VFG;
generating, by the VFG, the terminal output voltage, the VFG comprising a stator comprising a set of primary stator windings and a set of secondary stator windings for generating the terminal output voltage; and
operating a switch coupled to the set of secondary stator windings, the switch being configured to operate at a threshold frequency of the VFG to regulate the terminal output voltage by supplementing the terminal output voltage produced by the set of primary stator windings reducing the VFG fault over-voltage, wherein, responsive to detecting a fault, operating the switch to prevent a supply of current to the set of secondary windings and maintaining the terminal output voltage using the set of primary windings.

10. The method of claim 9, wherein each secondary stator winding is coupled to and controlled by individual switches.

11. The method of claim 9, wherein each secondary stator winding is coupled to and controlled by a single common switch.

12. The method of claim 9, wherein the switch is a pulse-width modulated PWM controlled switch.

13. The method of claim 9, wherein the control unit is a generator control unit for controlling the set of primary stator windings and the switch coupled to the set of secondary stator windings.

14. The method of claim 9, wherein the set of secondary stator windings comprises a wire gauge or number of strands in hand different than that used in the primary stator windings, and the secondary stator windings comprises a different number of turns than the primary stator windings.

15. The method of claim 9, further comprising operating the VFG above a configurable threshold frequency, the set of secondary stator windings supplement the set of primary stator windings by reducing an amount of exciter current supplied to the set of primary stator windings and increasing the amount of exciter current supplied to the set of secondary stator windings while maintaining the terminal output voltage.

16. The method of claim 9, wherein the terminal output voltage is regulated by adjusting the PWM duty cycle of the switch controlling the set of secondary stator windings, wherein the adjustment of the PWM duty cycle is based on the frequency of the VFG.

* * * * *